Figure 1:
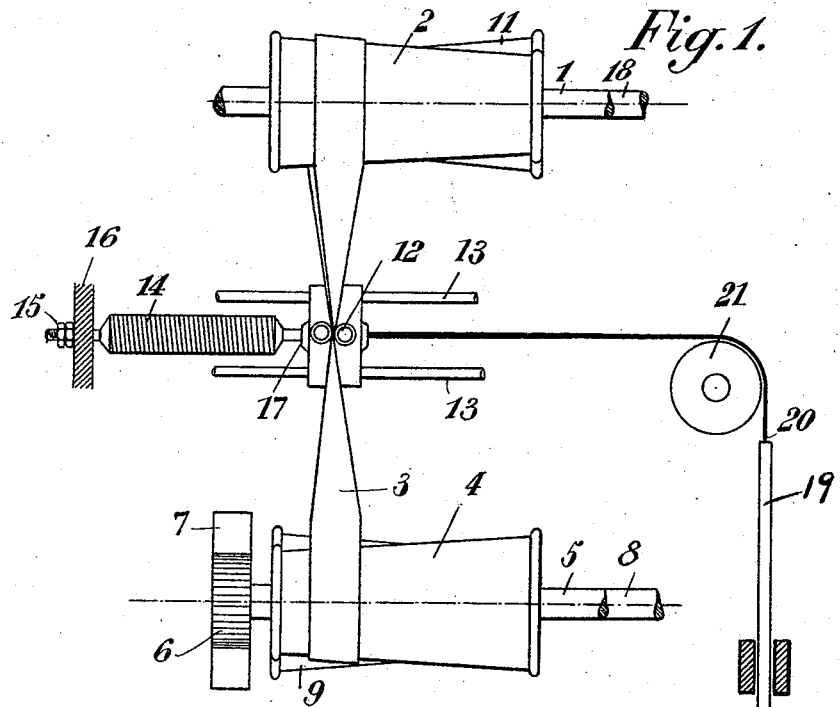

G. AGARONOFF.
DRAFT MECHANISM.
APPLICATION FILED APR. 22, 1914. RENEWED MAR. 25, 1916.

1,187,224.

Patented June 13, 1916.
2 SHEETS—SHEET 1.

Witnesses:

Inventor:
George Agaronoff

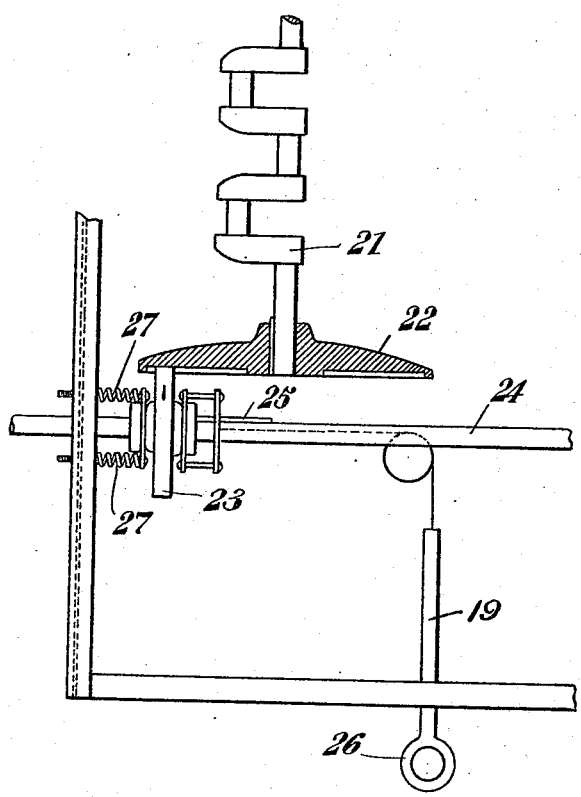

UNITED STATES PATENT OFFICE.

GEORGE AGARONOFF, OF SAMARA, RUSSIA.

DRAFT MECHANISM.

1,187,224.     Specification of Letters Patent.     Patented June 13, 1916.

Application filed April 22, 1914, Serial No. 833,748. Renewed March 25, 1916. Serial No. 86,781.

*To all whom it may concern:*

Be it known that I, GEORGE AGARONOFF, a subject of the Russian Emperor, and resident of Samara, Russia, have invented certain new and useful Improvements in Draft Mechanism, of which the following is a specification.

When a traction engine constructed for a given speed has to furnish a greater tractional effort than it is able to supply, it puts an over-load on its motor whereby the traction engine is stopped as the motor is not able to overcome the over-load when the speed remains the same. Where the load drawn by a traction engine varies considerably in proportion to its travel, for instance, when a gang of plows is connected to the traction engine, the ordinary type of change speed gearing will not permit of the quick adjustment necessary to be made as the load increases or diminishes, and furthermore, the engine driver has no way of acquainting himself with the fact that a heavier load has been suddenly applied in time to manually change the speed. However, when the traction engine is provided with a device for automatically varying the speed in accordance with the load attached thereto the drawbacks mentioned above are avoided and the following advantages obtained:

When plowing is carried out on irregular ground—*i. e.* ground hard in parts, soft in others, with rising and falling parts, the number of plows connected with the traction engine puts a larger or smaller load upon the motor but an engine provided with the device described will change its speed according to the resistance opposed at a given moment by the plows while the work done by the motor, its number of revolutions and its load remain the same.

An ordinary traction engine, able only to work at one speed, can be used on the irregular field described above only when it has the smallest number of plows attached to it which at the unfavorable places of the said field produce a resistance which is equal to the normal load of the motor of the traction engine. Thus, a loss of the power of the motor of the traction engine is obtained which might be utilized during the travel of the traction engine on the down slopes of the said field or in soft ground. If to this we add the fact that the tractional effort of the traction engine itself depends upon the condition of the ground upon which this traction engine is moving and especially that the tractional effort of the same traction engine is far from being the same in dry and wet weather, on a sand or clay ground, or on a ground covered with grass or still while plowing a soil having different degrees of softness (and setting up different frictional efforts), the importance of this automatic change speed gear will be readily understood.

Figure 2:
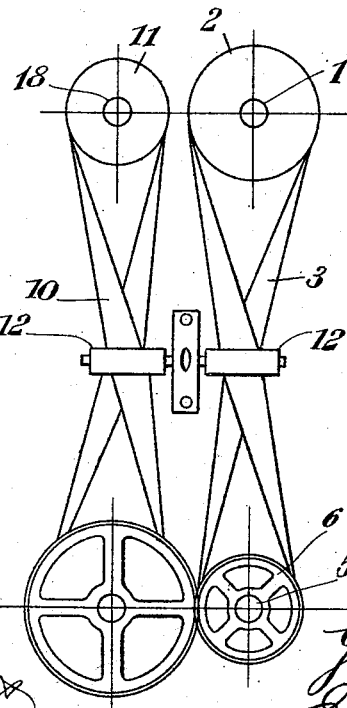

Figures 1 and 2 of the accompanying drawing show diagrammatically the construction of one form of embodiment of the invention. Fig. 3 is a modified form of the invention.

The friction shaft 1 passes through the driving pulley 2 which is conical. The belt 3 conveys the motive power from the cone pulley 2 to the cone pulley 4; the latter is secured to shaft 5 carrying on its end a toothed wheel 6 driving the toothed wheel 7 secured to shaft 8 which carries the cone-pulley 9. The latter and the cone-pulley 11 are connected by belt 10. The belts 3 and 10 driving the cone-pulleys described pass between two pairs of rollers 12 which are adapted to be shifted easily on rods 13 parallelly to the shafts of the cone-pulleys, thus shifting the driving belts on the said pulleys. The spring 14 the end 15 of which is secured to the framework 16 of the traction engine and the other end 17 of which is secured to the rollers, pulls the latter as well as the driving belts toward one end of the cone-pulleys and in this manner the speed of the shaft 18 which actuates the driving mechanism of the traction engine is increased. A draw bar or tractional member 19 is provided which has connected to it a flexible rope 20; this rope 20 in turn being connected to a block which carries the rollers 12. It will thus be seen that a tension on the draw bar 19 will cause the belts 3 and 10 to be shifted by the engagement of the roller 12, and thereby reduce the speed of the driven shaft. As readily seen the speed at which the traction engine is advancing, will vary according to the amount of the load attached to the tractional member 19 and according to the strength of the spring 14. But the speed of the shaft 1 as well as the speed of the motor of the traction engine will remain the same.

Fig. 3 of the drawing shows a diagram of another form of an embodiment of the invention. Here the driving shaft 21 carries keyed upon its end a disk 22 which drives through frictional engagement the disk 23 carried by shaft 24 which is provided with a friction clutch adapted to disengage the connection between the motor and the driving axle of the traction engine. The disk 23 can be shifted on the shaft 24 parallelly to itself thanks to splints 25. As in the example described above, when the plows attached to the tractional member 26 of the traction engine are disengaged, the disk 23 is pulled by the springs 27 to the outer circumference of disk 22 so that it is rotated at its maximum speed as well as the shaft 24. It follows that the traction engine also moves at a maximum speed. When the plows attached to the tractional member 26 are engaged, their resistance will overcome the strength of the springs 27 and will shift the disk 23 nearer to the center of the disk 22. It follows therefrom that the number of revolutions of the disk 23 as well as that of the shaft 24 will be reduced accordingly and at the same time the speed at which the traction engine advances will also be reduced.

Having now fully described my said invention, what I claim and desire to secure by Letters Patent, is:

1. In a traction engine of the kind described, the combination with the motor shaft and the driving shaft of the engine of a change speed device interposed between the said two shafts and means influenced by the load attached to the said traction engine and adapted to act upon the said change speed device so as to reduce the ratio of gearing in proportion to the increase of the load, substantially as and for the purpose set forth.

2. In a traction engine of the kind described, the combination with the motor shaft, the driving shaft and the framework of the engine of a change speed device interposed between the said shafts and comprising a movable controlling member, a spring member secured at one end to the said framework of the traction engine and at the other to the said movable controlling member of said change speed device so as to cause the latter to work at the highest speed, a movable tractional member adapted to receive the load and means connecting the said tractional member with the said movable controlling member of the change speed device so as to allow the load attached to said tractional member to move the said movable controlling member against the action of said spring member toward positions where the speed transmitted is slower, substantially as and for the purpose set forth.

3. In a draft mechanism, a driving element, a driven element, and a draft element, a change speed element interposed between the driving element and the driven element, means operable upon changes of load which may be imposed upon the draft element for operating the change speed element.

4. In a draft vehicle, the combination with the motor shaft and the ground wheel shaft, of a change speed element interposed between the said shafts, a draw bar, a resilient connection between the draw bar and the draft vehicle, and operating means between the draw bar and change speed element, whereby successive changes of load which may be connected to the draw bar will cause corresponding changes in gear ratio of the change speed element.

5. In a draft vehicle having a variable speed changing element, a draw bar, resilient means connecting the draw bar to the vehicle, and connecting means between the draw bar and the change speed element, whereby any changes of load which may be imposed upon the draw bar will cause changes of gear ratio in the change speed element.

In testimony whereof I have hereunto set my hand in presence of two witnesses.

GEORGE AGARONOFF.

Witnesses:
A. H. SCHWARZENBACH,
STEPHEN LINK.

Copies of this patent may be obtained for five cents each, by addressing the "Commissioner of Patents, Washington, D. C."